United States Patent [19]

Sexstone et al.

[11] 4,351,792

[45] Sep. 28, 1982

[54] APPARATUS FOR MAKING GROOVES IN TOBACCO SMOKE FILTERS

[75] Inventors: John H. Sexstone, Anchorage; Tom Lewis; Ken Milliner, both of Louisville, all of Ky.

[73] Assignee: Brown & Williamson Tobacco Corporation, Louisville, Ky.

[21] Appl. No.: 245,872

[22] Filed: Mar. 23, 1981

Related U.S. Application Data

[62] Division of Ser. No. 167,554, Jul. 11, 1980, Pat. No. 4,324,540.

[51] Int. Cl.$^3$ .............................................. B29D 31/00

[52] U.S. Cl. .................................... 264/293; 264/320

[58] Field of Search ............... 425/290, 291, 301, 383, 425/392; 264/151, 154, 293, 320; 493/42, 43, 46

[56] References Cited

U.S. PATENT DOCUMENTS

| | | | |
|---|---|---|---|
| 3,306,306 | 2/1967 | Rudszinat | 493/42 X |
| 3,804,695 | 4/1974 | Randall | 156/441 |
| 4,075,936 | 2/1978 | Berger | 493/43 |
| 4,149,546 | 4/1979 | Luke | 425/383 X |
| 4,164,438 | 8/1979 | Lebet | 493/43 X |

*Primary Examiner*—Thomas P. Pavelko

*Attorney, Agent, or Firm*—Charles G. Lamb

[57] ABSTRACT

Cigarette filters having grooves therein are prepared by subjecting cigarette filters to a groove-making device which includes heated groove-making elements therein, the grooves being formed by the use of heat and pressure as the cigarette filters come in contact with the groove-making elements.

5 Claims, 3 Drawing Figures

APPARATUS FOR MAKING GROOVES IN TOBACCO SMOKE FILTERS

This is a division of application Ser. No. 167,554 filed July 11, 1980, now U.S. Pat. No. 4,324,540 issued Apr. 13, 1982.

BACKGROUND OF THE INVENTION

1. Field of the Invention

The present invention relates to an apparatus for making grooved filters and more particularly relates to an apparatus for making grooves in a cigarette filter. Even more particularly the present invention relates to an apparatus for making grooves in filters for cigarettes utilizing pressure and heat means for making the grooves.

2. Description of the Prior Art

In the manufacture of cigarettes, most cigarettes are provided with filter devices on the end thereof to remove undesirable materials in the smoke stream coming from the tobacco column during smoking. These filters, which are attached to the tobacco column, come in many different sizes, shapes and forms. Some filters which are presently on the market include grooves therein which facilitate in the by-passing of the smoke around the filter; provide means for mixing of the by-passed smoke stream with ventilating air; or provide means for allowing only ventilating air to pass along the groove. In the preparation of these filters, many different suggestions have been made as means for making the grooves therein. U.S. Pat. No. 3,804,695 teaches the use of a pair of parallel rolls in pressure engagement defining a nip therebetween wherein one of the rolls is provided with a circumferential or a helical grooved surface so that, as filter tow passes therethrough, permanent depressions are made along the longitudinal dimensions of the tow. U.S. Pat. No. 4,149,546 teaches an apparatus for making grooves in a cigarette filter wherein a filter rod is moved in an arcuate path transverse to a heated forming means, the filter rod being supported and conveyed for the relative movement at the periphery of a drum-shaped inner rotor and the forming means comprises a heated arcuate outer stator element or elements projecting inwardly toward the rotor.

SUMMARY OF THE INVENTION

In the present invention, it is recognized that it is desirable to provide an apparatus for making grooves in a filter rod. Furthermore, it is recognized that it is desirable to provide an apparatus for making grooves in a filter rod at a relatively high rate of production. Even further, it is recognized that it is desirable to provide an apparatus for making filters of uniform quality.

The present invention advantageously provides an apparatus for making grooves in a filter rod wherein, in a preferred embodiment, filter rods are fed from a hopper to a rotating cylinder or drum having grooves therein for receiving the filter rods. The filter rods are then fed to a conveying device which is disposed in a preferred arrangement in a vertical position wherein the rods move downwardly past a device having a plurality of groove-forming heating blades, the blades coming in groove-forming contact with the filter rods passing thereby. Furthermore, if the filter rods are made from a cellulose acetate wrapped with a non-porous plug wrap, the method of making the indentations or grooves in the filter rod by a heated protruding blade will provide improvement of the imperviousness of the wrap.

Various impressed formation may be produced by the present invention. For example, a groove that will extend along a part of the length of the rod or the entire length of the rod as well as a plurality of longitudinally extending grooves therein may be made by pre-selected arrangement of grooving means. Furthermore, circumferential grooves may also be made in the filter rod.

The filter rod may be made of various filtering materials such as thermo-plastic polymers, for example, cellulose acetate or polypropylene. Paper filters would be suitable if the paper was wetted or contained a proportion of thermo-plastic material or was coated with heat activated adhesives.

Various other features of the present invention will become obvious to those skilled in the art upon reading the disclosure set forth hereinafter.

More particularly, the present invention provides an apparatus for making grooves in a cigarette filter rod comprising: conveying means; means to feed filter rods to the conveying means; stationarily mounted heated groove-making means in preselected spaced relation with the conveying means; and, receiving means in discharge relation with the conveying means.

It is to be understood that the description of the examples of the present invention given hereinafter are not by way of limitation and various modifications within the scope of the present invention will occur to those skilled in the art upon reading the disclosure set forth hereinafter.

BRIEF DESCRIPTION OF THE DRAWINGS

Referring to the drawings.

DESCRIPTION OF THE PREFERRED EMBODIMENTS

Figure 1:
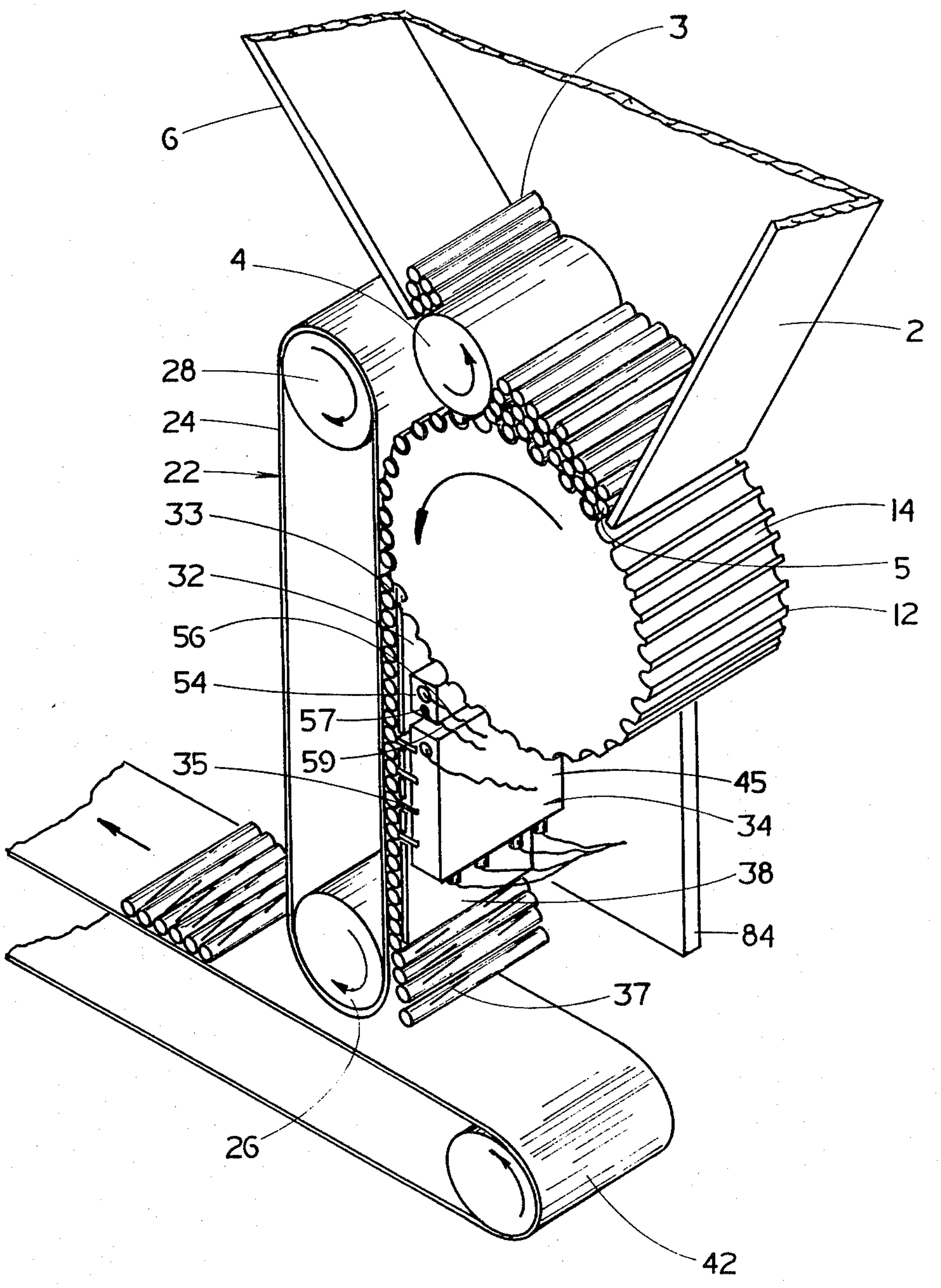
FIG. 1 is a perspective view, with selected portions cut away, of one preferred filter rod groove-making machine for longitudinally extending grooves, including feed and discharge units.

The machine shown in FIG. 1 comprises a hopper 2 which includes a plurality of filter rod elements 3 therein. The hopper 2 is provided with a discharge opening 5 which is in feed relation with a feed drum 12. A refuser roller 4 is provided at the opening between one side of the hopper 2, the side being identified by the numeral 6, and the feed drum 12. The feed drum 12 is provided with a plurality of flutes 14 therein wherein the flutes 14 are of substantially the same shape as the filter rods 3 and disposed for receiving a filter rod 3 in each of the flutes 14. The feed drum 12 is provided with driving means (not shown) wherein the feed drum 12 turns in a direction to pick up the filter rods 3 fed from the hopper 2.

The refuser roller 4 is spaced within the opening 5 below the downward terminating end of side 6 and is spaced from the feed drum 12 a pre-selected distance to prevent the passage of filter rods 3 which are adjacent thereto and not contained in the flutes 14 of the feed drum 12 and at the same time assist in the setting of the filter rods 3 within the flutes 14 passing therebeneath.

The refuser roller 4 is provided with driving means (not shown) and rotates in the same direction as the cylindrical feed drum 12.

An endless belt conveyor 22 is provided to receive the filter rods 3 from the feed drum 12. The endless belt conveyor 22 is provided with a retractable pressure belt 24 and has two sprockets at opposite ends thereof. The sprocket 26 is an idler sprocket and the sprocket 28 is driven by any known driving means. Sprocket 26 may also be moveably mounted to swing away from a grooving block assembly 34 of the apparatus, to be discussed hereinafter.

A stationarily mounted pressure plate 32 is provided and extends in a vertical direction in parallel with and spaced from the endless belt conveyor 22 when in its normal operating position. The spacing between the plate 32 and conveyor 22 in its normal operating position is a distance equal to approximately the diameter of a filter rod 3. The upward extending terminating point of the stationary plate 32 is adjacent to the feed drum 12 so as to receive the filter rods 3 at a designated point 33 and in combination with the pressure belt 24 moves the filter rods 3 vertically downward into the heated groove-making portion of the apparatus.

Figure 2:
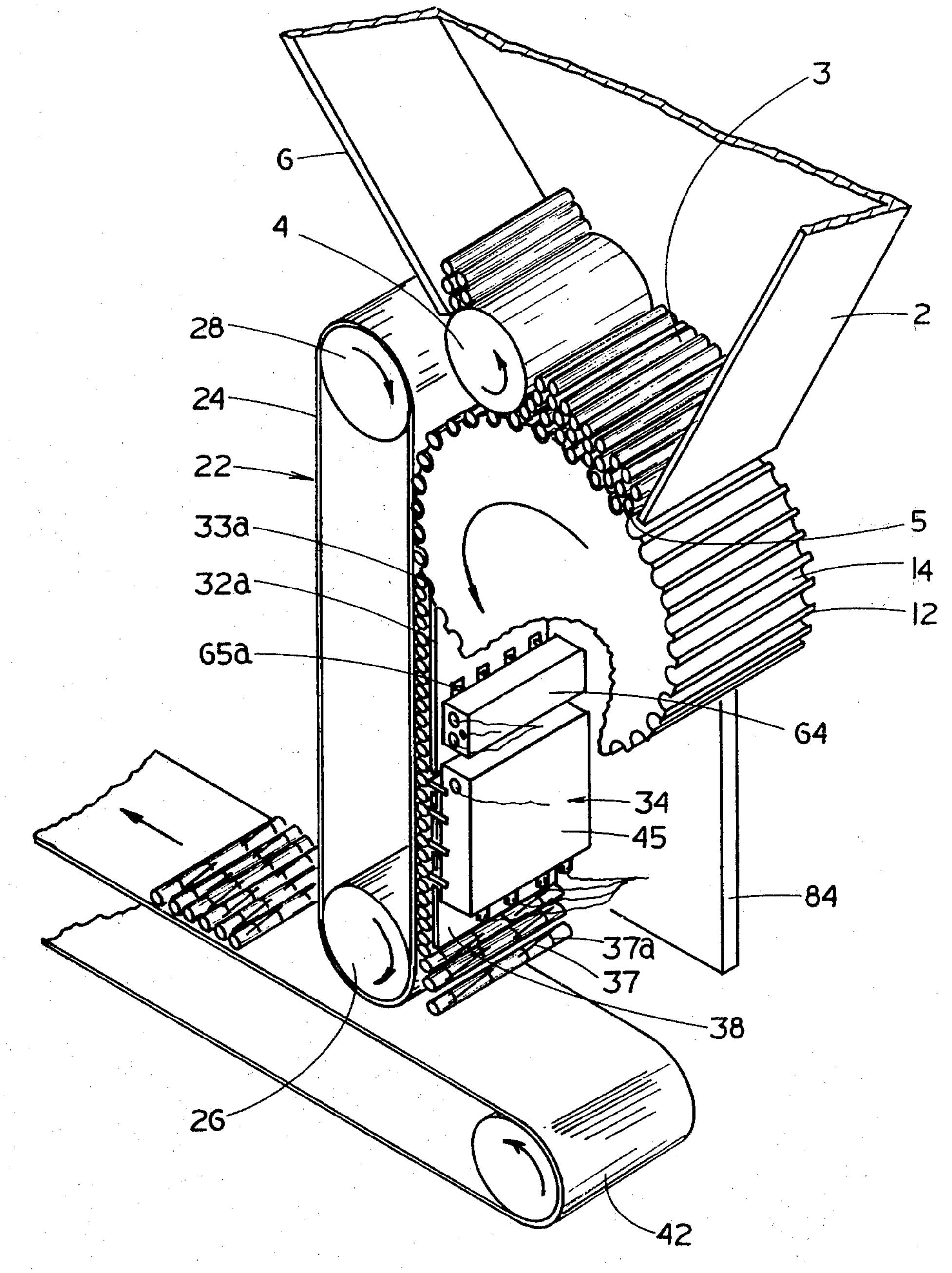
FIG. 2 is a perspective view, with selected portions cut away, of a preferred filter rod groove-making machine, for longitudinal and circumferential grooves, including feed and discharge units; and, FIG. 3 is an enlarged view, in perspective, of filter rod groove block assemblies of the apparatus of FIG. 2.
Figure 3:
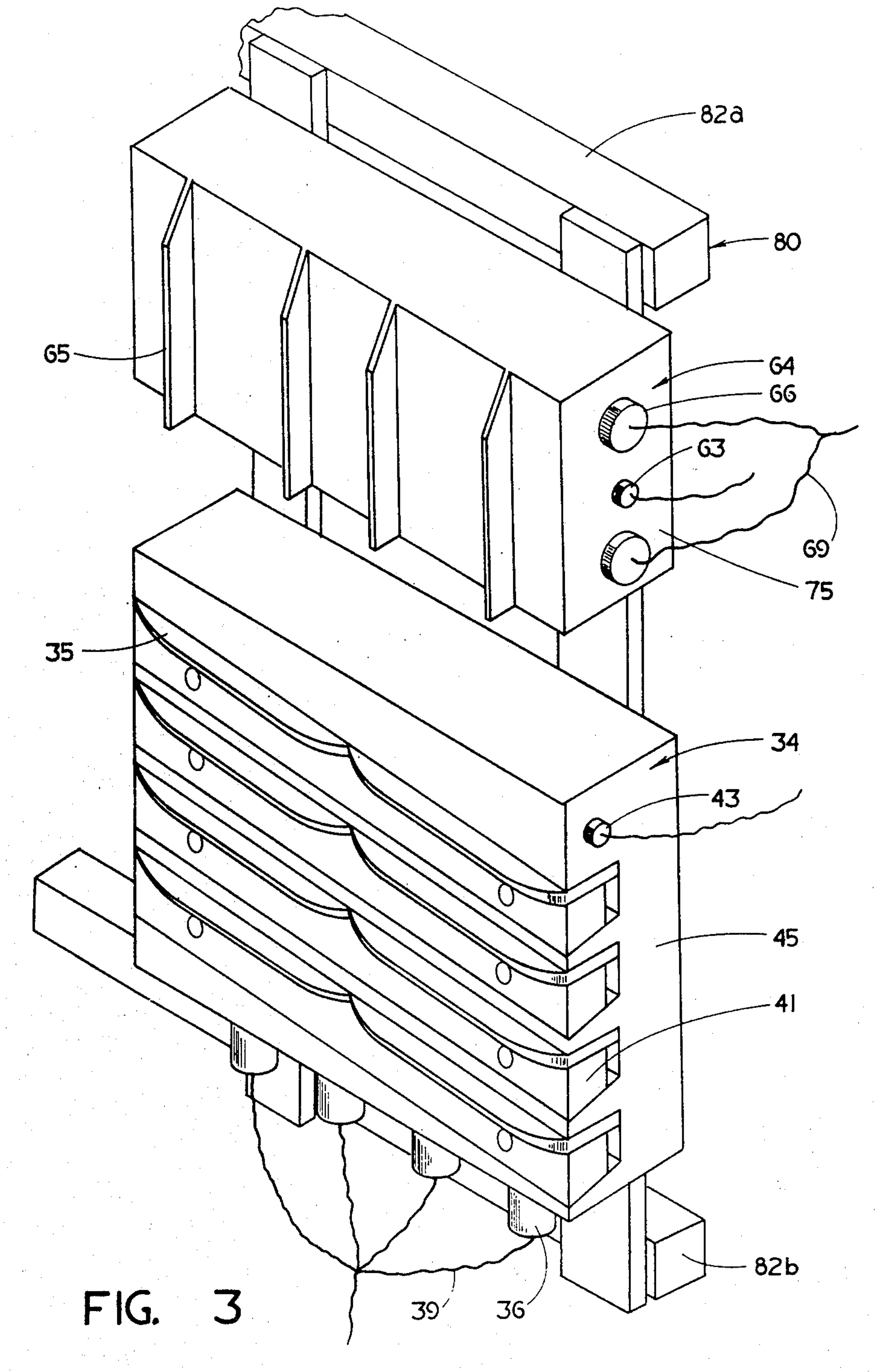

Disposed vertically below the downward terminating end of the flat plate member 32 is the longitudinal grooving block assembly 34 including a housing block 45. The block 45 as best shown in FIG. 3 is provided with means to house a plurality of heated protruding groove-forming blades 35 which are aligned with and spaced inwardly from the plate member 32 (FIGS. 1 and 2). The inwardly extending distance between the plate member 32 and the heated blade 35 defines the depth of the groove 37 in the filter rod 3. The heated protruding blades 35 are heated by electrical elements 36 which are in electrical communication with any known power supply source through electrical lines 39. A plurality of flat heat conducting wedge members 41 are also provided in block 45 as support and heat conducting means for the blades 35 and the filter rods 3 as they pass thereby in their downward movement toward a backup plate 38. Block 45, wedge member 41, and blade members 35 may be any well known heat conducting materials.

Backup plate 38 is provided for vertical alignment with the wedge members 41 and the feed plate 32. Backup plate 38 supports the filter rods 3 as the rods 3 discharge onto a take-away conveyor 42, which is shown as an endless belt conveyor.

In FIG. 1 mounted in alignment with and directly above the block assembly 34 is a preheater 54. Preheater 54 is attached to the feed plate 32, which is generally of a heat conducting material, so that as the filter rod elements 3 roll past, they are preheated prior to contact with the blades 35. Heat is supplied to preheater 54 through electrical communication with any known power supply source. However, even though a preheater is shown and preferred, it is realized that in some applications a preheater is not necessary.

In FIGS. 2 and 3 mounted in alignment with and directly above the block assembly 34 is the circumferential grooving block assembly 64. Block assembly 64 includes a block 75 with a plurality of outwardly extending groove-forming blades 65, block 75 and blades 65 being unitary and made of a heat conducting material. Heating elements 66 are attached to the block 75 for heating the block 75 and the blades 65, elements 66 being in electrical communication with any known power supply source through electrical lines 69.

In FIG. 2, a stationarily mounted plate 32*a* is provided and extends in a vertical direction in parallel with and spaced from the endless belt conveyor 22 when in its normal operating position. The spacing between the plate 32*a* and conveyor 22 in its normal operating position is a distance equal to approximately the diameter of a filter rod 3. The upward extending terminating point of the stationary plate 32*a* is adjacent to the feed drum 12 so as to receive the filter rods 3 at a designated point 33*a* and in combination with the pressure belt 24 moves the filter rods 3 vertically downward into the heated groove-making portion of the apparatus.

The plate 32*a* is also provided with a plurality of longitudinally extending slots 65*a* therein, slots 65*a* being in alignment with and disposed to receive blades 65 (FIG. 3) therethrough.

The assemblies 34 and 64 are mounted onto support apparatus 80 (FIG. 3) by any known means, apparatus 80 being provided with support members 82*a* and *b* which are attached to main support 84 (FIGS. 1 and 2) by any known means. Main support 84 may be a plurality of strip or angle members or a sheet support and the entire machine is generally attached thereto by any known means. Since the attachment of the machine to a support, such as support 84, is not material to the practice of the present invention, further detail will not be elaborated upon.

In the operation of the machine of the present invention, as shown in FIG. 1, the filter rods 3 are fed into the feed drum 12 and moved to the conveyor 22 where they are received by the conveyor 22 in combination with the feed plate member 32. Since the feed plate member 32 is stationarily disposed and the retractable pressure belt 24 is moveable, the filter rods 3 roll between the belt 24 and plate member 32 at a predetermined revolving speed. As the rods 3 roll down between the plate 32 and the belt 24, the filter rods 3 are preheated to a preselected temperature by preheater 54. A first longitudinal groove 37 is then made in the preheated filter rods by the first heated protruding blade 35. Rods 3 then roll past and are subsequently contacted by other heated protruding blades 35 at preselected spaces along the circumference of each filter rod 3. The pressure on the retractable pressure belt 24 is predetermined so that there is no slippage of the rods 3 as they pass between the belt and the heated elements of the apparatus. Upon leaving the grooving block assembly of the apparatus, the filter rods 3 continue to roll downwardly and onto the take-away conveyor 42.

In the operation of the machine of the present invention, as shown in FIG. 2, the only difference in the making of the grooves in the rods 3 as shown in FIG. 1 and described hereinbefore, is the addition of the circumferential groove 37*a*. In this machine, the filter rods 3 roll down between the plate 32*a* and the belt 24 and a plurality of circumferential grooves 37*a* are made by the heated protruding blades 65. Preheating of the rods 3 in this machine is generally not necessary since the retention time between the rods 3 and blades 65 is of greater duration than between the blades 35 and the rods 3. Furthermore, heat from the blades 65 also act as a preheat means for the rods before they come in contact with the longitudinal groove-making blades 35.

Preferably, temperture control means are provided to control the amount of heat the filter rods 3 are subjected to. In the example shown in FIG. 3, temperature controllers 43 and 63 are utilized and may be any known in the prior art. In FIG. 1, the numerals 57 and 59 represent a temperature controller and electrical wiring thereto, respectively.

It will be realized that various changes may be made to the specific embodiments shown and described without departing from the principles and spirit of the present invention.

What is claimed is:

1. A method of making substantially longitudinal grooves in cigarette filter rods comprising the steps of:

(a) feeding filter rods linearly and substantially parallel to a stationairly mounted heated groove-forming device; and, (b) rolling said filter rods in contacting relation with said heated groove-forming device to form grooves in said rods.

2. The method of claim 1 wherein said heated groove-forming device includes a plurality of groove-forming blades.

3. The method of claim 2 wherein said rolling said rods in contacting relation with said groove-forming blades is in a vertical direction, said groove-forming blades being vertically aligned.

4. The method of claim 2 wherein said rolling said rods in contacting relation with said groove-forming blades is in a vertical direction, said groove-forming blades being substantially horizontally aligned.

5. The method of claim 2 wherein said rolling said rods in contacting relation with said groove forming blades includes two sets of groove-forming blades, one set of blades being substantially horizontally aligned, the other set of blades being substantially vertically aligned.

* * * * *